US007983167B1

(12) United States Patent
Cohen et al.

(10) Patent No.: US 7,983,167 B1
(45) Date of Patent: *Jul. 19, 2011

(54) QUALITY OF SERVICE FOR A STACKABLE NETWORK SWITCH

(75) Inventors: Yuval Cohen, Raanana (IL); Tal Anker, Modiin (IL)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/334,612

(22) Filed: Dec. 15, 2008

Related U.S. Application Data

(63) Continuation of application No. 10/883,540, filed on Jun. 30, 2004, now Pat. No. 7,466,653.

(51) Int. Cl.
*H04L 12/26* (2006.01)
(52) U.S. Cl. ........................................ 370/235
(58) Field of Classification Search ............... None
See application file for complete search history.

(56) References Cited

U.S. PATENT DOCUMENTS

| | | | |
|---|---|---|---|
| 6,366,577 B1 | 4/2002 | Donovan | |
| 6,487,170 B1 | 11/2002 | Chen et al. | |
| 6,631,122 B1 | 10/2003 | Arunachalam et al. | |
| 6,654,363 B1 | 11/2003 | Li et al. | |
| 6,708,034 B1 | 3/2004 | Sen et al. | |
| 6,934,292 B1 | 8/2005 | Ammitzboell | |
| 7,069,337 B2 | 6/2006 | Rawlins et al. | |
| 7,143,168 B1 | 11/2006 | DiBiasio et al. | |
| 7,184,441 B1 | 2/2007 | Kadambi et al. | |
| 7,212,491 B2 | 5/2007 | Koga | |
| 7,260,060 B1 | 8/2007 | Abaye et al. | |
| 7,428,216 B2 | 9/2008 | Siddiqui et al. | |
| 7,480,258 B1 * | 1/2009 | Shuen et al. | 370/256 |
| 2002/0091810 A1 | 7/2002 | Hundscheidt et al. | |
| 2002/0194369 A1* | 12/2002 | Rawlins et al. | 709/238 |
| 2003/0204596 A1 | 10/2003 | Yadav | |
| 2006/0251085 A1 | 11/2006 | Kalkunte et al. | |

OTHER PUBLICATIONS

Braden et al., "RFC 2205: Resource Reservation Protocol (RSVP)—Version 1 Functional Specification," Standards Track, Sep. 1997, pp. 1-112, University of Michigan, US.
USPTO Non-Final Office Action mailed Oct. 17, 2007 for U.S. Appl. No. 10/883,540, filed Jun. 30, 2004.
Amendment filed Mar. 20, 2008 in response to USPTO Non-Final Office Action mailed Oct. 17, 2007 for U.S. Appl. No. 10/883,540, filed Jun. 30, 2004.
USPTO Final Office Action mailed Jun. 5, 2008 for U.S. Appl. No. 10/883,540, filed Jun. 30, 2004.
Amendment after Final filed Jul. 18, 2008 in response to Uspto Final Office Action mailed Jun. 5, 2008 for U.S. Appl. No. 10/883,540, filed Jun. 30, 2004.

* cited by examiner

*Primary Examiner* — Anh-Vu Ly

(57) ABSTRACT

A first sub-switch for a network switch includes a plurality of ports. A forwarding engine communicates with the ports. A control plane processor communicates with the forwarding engine. A first sub-switch interface communicates with the forwarding engine and receives a path message from a second sub-switch in the network switch. A second sub-switch interface communicates with the forwarding engine, transmits the path message to a third sub-switch in the network switch, and receives a reserve message from the third sub-switch identifying requested resources for a planned data flow having a quality of service. The control plane processor attempts to reserve the requested resources on the second sub-switch interface based on the quality of service.

20 Claims, 3 Drawing Sheets

QUALITY OF SERVICE FOR A STACKABLE NETWORK SWITCH

CROSS-REFERENCE TO RELATED APPLICATIONS

This application is a continuation of U.S. patent application Ser. No. 10/883,540, filed Jun. 30, 2004. The disclosure of the above application is incorporated herein by reference in its entirety.

BACKGROUND

The present invention relates generally to data communications. More particularly, the present invention relates to quality of service for stackable network switches.

The rapidly increasing popularity of networks such as the Internet has spurred the development of network services such as streaming audio and streaming video. These new services have different latency requirements than conventional network services such as electronic mail and file transfer. New quality of service (QoS) standards require that network devices, such as network switches, address these latency requirements. For example, the IEEE 802.1 standard divides network traffic into several classes of service based on sensitivity to transfer latency, and prioritizes these classes of service. The highest class of service is recommended for network control traffic, such as switch-to-switch configuration messages. The remaining classes are recommended for user traffic. The two highest user traffic classes of service are generally reserved for streaming audio and streaming video. Because the ear is more sensitive to missing data than the eye, the highest of the user traffic classes of service is used for streaming audio. The remaining lower classes of service are used for traffic that is less sensitive to transfer latency, such as electronic mail and file transfers.

Network devices such as network switches must be configured appropriately to support quality of service. In particular, the user must configure the ports and switch tables of each network switch to support the bandwidth and latency requirements of each data flow the user expects to pass through the network switch.

A stackable switch comprises a plurality of stack units. Like regular network switches, each stack unit comprises ports, a forwarding engine, and a control plane processor (CPP). But each stack unit also includes one or more stacking interfaces for interconnecting a plurality of the stack units via stacking links to form the stackable switch, in which one of the stack units is configured as the master stack unit. A stackable switch performs as a single large switch.

The resources, such as available bandwidth, of these stacking links must be considered when configuring a stackable network switch to support quality of service, thus adding to the burden of the user configuring the switch.

SUMMARY

In general, in one aspect, the invention features a method, apparatus, and computer-readable media for a stackable network device comprising a plurality of stack units interconnected by a plurality of stacking links, wherein each of the stack units comprises a control plane processor, a plurality of ports to receive and transmit packets of data, and a forwarding engine to transfer the packets of data between the ports in accordance with the control plane processor, wherein the control plane processor in a first one of the stack units identifies a path for a planned data flow within the stackable network device, the identified path comprising a plurality of the stack units interconnected in series by one or more of the stacking links and comprising a first stack unit that is the source of the planned data flow and a last stack unit that is the destination of the planned data flow, wherein the planned data flow has a quality of service; wherein the control plane processor in the first one of the stack units transmits a path message over the identified path; wherein the control plane processors in each of the stack units, other than the first one of the stack units, in the identified path, receive the path message from a next upstream one of the stack units in the identified path, and transmit the path message to a next downstream one of the stack units in the identified path; wherein the control plane processor in the last one of the stack units in the identified path transmits a reserve message over the identified path; wherein the control plane processors in each of the stack units, other than the last one of the stack units, in the identified path, receive the reserve message from a next downstream one of the stack units in the identified path, and make an attempt to reserve resources on the one of the stacking links connected to the next downstream one of the stack units according to the quality of service of the planned data flow; and wherein the control plane processors in each of the stack units, other than the first and last ones of the stack units, in the identified path, transmit the reserve message to a next upstream one of the stack units in the identified path when the attempt to reserve resources is successful.

Particular implementations can include one or more of the following features. The planned data flow comprises packets of data received by a predetermined port of the last one of the stack units and having predetermined values in one or more fields of the packets. The predetermined values in one or more fields of the packets represent at least one of the group consisting of source address; Differentiated Services (DiffServe) Code Point (DSCP) field; one or more of the ports; destination address; and protocol type. The control plane processor of the first one of the stack units receives a request to reserve resources in the stackable network device for the planned data flow and identifies the path for the planned data flow in accordance with the request to reserve resources. The control plane processor of the first one of the stack units transmits a confirmation message to the sender of the request to reserve resources when all of the attempts to reserve resources are successful. The request to reserve resources is selected from the group consisting of a Resource Reservation Protocol (RSVP) Path message; and a user configuration request. The request to reserve resources comprises a Resource Reservation Protocol (RSVP) Path message that identifies a downstream network device; and wherein the control plane processor of the last one of the stack units in the identified path transmits the RSVP Path message to the downstream network device when all of the attempts to reserve resources are successful. When any attempt to reserve resources is unsuccessful, the control plane processor in the first one of the stack units identifies a second path for the planned data flow within the stackable network device, the second identified path comprising a plurality of the stack units interconnected in series by one or more of the stacking links, the plurality of stack units comprising the first one of the stack units, and transmits a path message over the second identified path. The control plane processor in the first one of the stack units periodically transmits a refresh message over the identified path; wherein the control plane processors in each of the other stack units transmits the refresh message to a next downstream one of the stack units in the identified path; and wherein when one of the stack units, other than the first one of the stack units, in the identified path, does not receive one of the refresh messages during a predetermined interval, the control plane processor in the one of the stack units releases the resources reserved on the one of the stacking links connected to the next upstream one of the stack units. A stackable network switch comprises the stackable network device.

In general, in one aspect, the invention features a method, apparatus, and computer-readable media for a first stack unit in a stackable network device comprising a plurality of the stack units interconnected by a plurality of stacking links, the first stack unit comprising a control plane processor to receive, from a third stack unit, a path message that identifies a second stack unit; wherein the control plane processor transmits the path message to the second stack unit; wherein the control plane processor receives, from the second stack unit, a reserve message; wherein the reserve messages identifies a requested resources for a planned data flow within the stackable network device, wherein the planned data flow has a quality of service; a plurality of ports to receive and transmit packets of data; and a forwarding engine to transfer the packets of data between the ports in accordance with the control plane processor; wherein, in response to the reserve message, the control plane processor makes an attempt to reserve the requested resources on the one of the stacking links connecting the first and second stack units according to the quality of service; wherein, when the attempt to reserve resources is successful, the control plane processor transmits the reserve message to the third stack unit.

Particular implementations can include one or more of the following features. The planned data flow comprises packets of data received by a predetermined port of the stackable network device and having predetermined values in one or more fields of the packets. The predetermined values in one or more fields of the packets represent at least one of the group consisting of source address; Differentiated Services (DiffServe) Code Point (DSCP) field; one or more of the ports; destination address; and protocol type. When the attempt to reserve resources is successful, the control plane processor transmits a confirmation message to the second stack unit. When any attempt to reserve resources is unsuccessful, the control plane processor transmits a failure message to the second stack unit. A stackable network switch comprises the stackable network device.

In general, in one aspect, the invention features a method, apparatus, and computer-readable media for a stackable network device comprising a plurality of stack units interconnected by a plurality of stacking links, wherein each of the stack units comprises a control plane processor, a plurality of ports to receive and transmit packets of data, and a forwarding engine to transfer the packets of data between the ports in accordance with the control plane processor, wherein the control plane processor in a first one of the stack units identifies a path for a planned data flow within the stackable network device, the identified path comprising a plurality of the stack units interconnected in series by one or more of the stacking links and comprising a first stack unit that is the source of the planned data flow and a last stack unit that is the destination of the planned data flow, wherein the planned data flow has a quality of service; wherein the control plane processor in the first one of the stack units transmits a reserve message over the identified path; and wherein the control plane processors in each of the stack units, other than the first one of the stack units, in the identified path, receive the reserve message from a next upstream one of the stack units in the identified path, and make an attempt to reserve resources on the one of the stacking links connected to the next upstream one of the stack units according to the quality of service of the planned data flow; and wherein the control plane processor in each of the stack units, other than the first and last ones of the stack units, in the identified path, transmit the reserve message to a next downstream one of the stack units in the identified path when the attempt to reserve resources is successful.

Particular implementations can include one or more of the following features. The planned data flow comprises packets of data received by a predetermined port of the first one of the stack units and having predetermined values in one or more fields of the packets. The predetermined values in one or more fields of the packets represent at least one of the group consisting of source address; Differentiated Services (DiffServe) Code Point (DSCP) field; one or more of the ports; destination address; and protocol type. The control plane processor of the first one of the stack units receives a request to reserve resources in the stackable network device for the planned data flow and identifies the path for the planned data flow in accordance with the request to reserve resources. The control plane processor of the first one of the stack units transmits a confirmation message to the sender of the request to reserve resources when all of the attempts to reserve resources are successful. The request to reserve resources is selected from the group consisting of a Resource Reservation Protocol (RSVP) Path message; and a user configuration request. The request to reserve resources comprises a Resource Reservation Protocol (RSVP) Path message that identifies a downstream network device; and wherein the control plane processor of the last one of the stack units in the identified path transmits the RSVP Path message to the downstream network device when all of the attempts to reserve resources are successful. When any attempt to reserve resources is unsuccessful, the control plane processor in the first one of the stack units identifies a second path for the planned data flow within the stackable network device, the second identified path comprising a plurality of the stack units interconnected in series by one or more of the stacking links, the plurality of stack units comprising the first one of the stack units, and transmits a reserve message over the second identified path. The control plane processor in the first one of the stack units periodically transmits a refresh message over the identified path; wherein the control plane processors in each of the other stack units transmits the refresh message to a next downstream one of the stack units in the identified path; and wherein when one of the stack units, other than the first one of the stack units, in the identified path, does not receive one of the refresh messages during a predetermined interval, the control plane processor in the one of the stack units releases the resources reserved on the one of the stacking links connected to the next upstream one of the stack units. A stackable network switch comprises the stackable network device.

In general, in one aspect, the invention features a method, apparatus, and computer-readable media for a first stack unit in a stackable network device comprising a plurality of the stack units interconnected by a plurality of stacking links, the first stack unit comprising a control plane processor to receive, from a second stack unit, a reserve message that identifies a requested resources for a planned data flow within the stackable network device and a third stack unit, wherein the planned data flow has a quality of service; a plurality of ports to receive and transmit packets of data; and a forwarding engine to transfer the packets of data between the ports in accordance with the control plane processor; wherein, in response to the reserve message, the control plane processor makes an attempt to reserve the requested resources on the one of the stacking links connecting the first and second stack units according to the quality of service; wherein, when the attempt to reserve resources is successful, the control plane processor transmits the reserve message to the third stack unit.

Particular implementations can include one or more of the following features. The planned data flow comprises packets of data received by a predetermined port of the stackable network device and having predetermined values in one or more fields of the packets. The predetermined values in one or more fields of the packets represent at least one of the group consisting of source address; Differentiated Services (DiffServe) Code Point (DSCP) field; one or more of the ports; destination address; and protocol type. When the attempt to reserve resources is successful, the control plane processor transmits a confirmation message to the second stack unit. When any attempt to reserve resources is unsuccessful, the control plane processor transmits a failure message to the second stack unit. A stackable network switch comprises the stackable network device.

The details of one or more implementations are set forth in the accompanying drawings and the description below. Other features will be apparent from the description and drawings, and from the claims.

Figure 1:
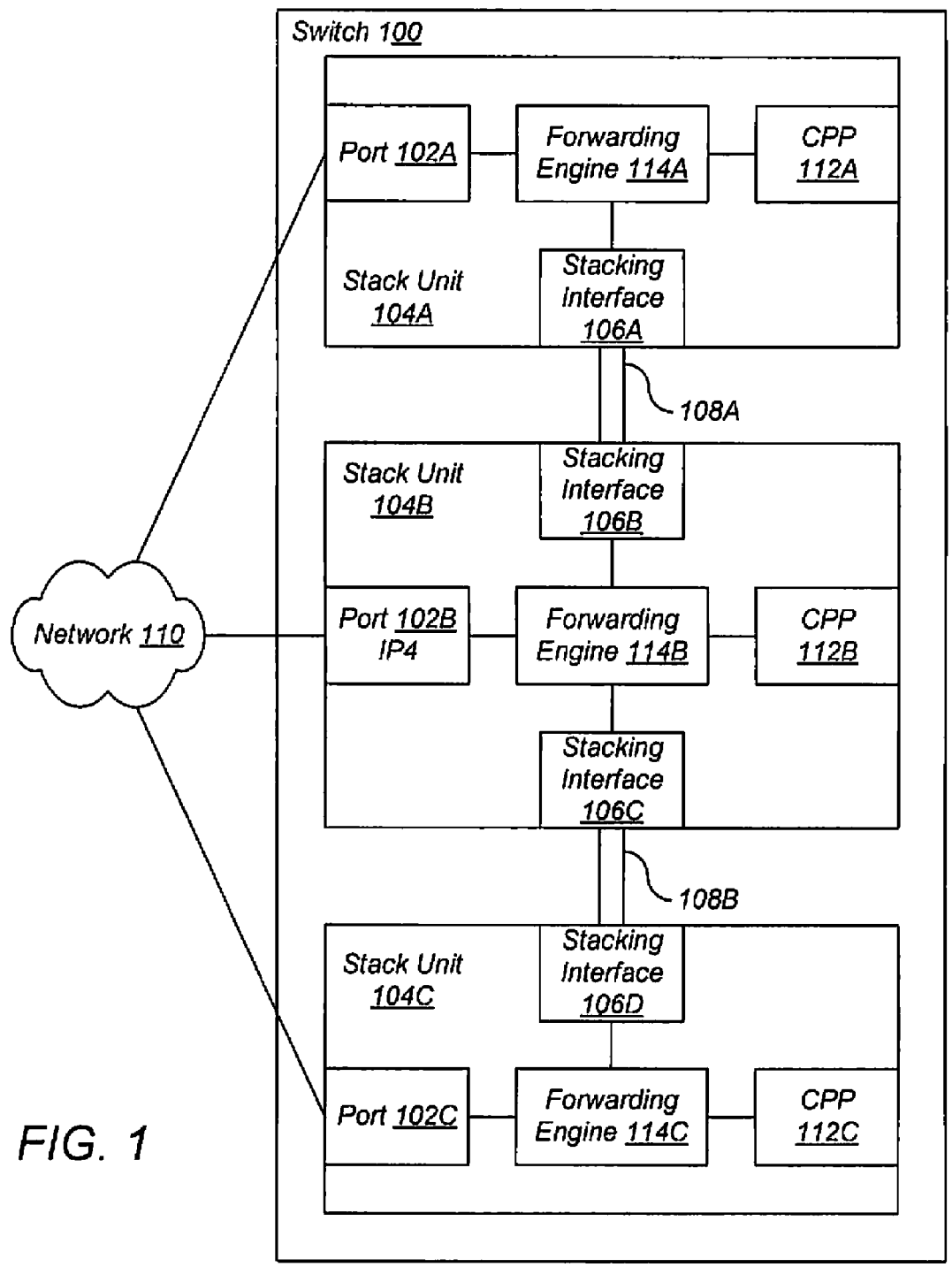
FIG. 1 shows a stackable network switch connected to a network such as the Internet according to a preferred embodiment.

The leading digit(s) of each reference numeral used in this specification indicates the number of the drawing in which the reference numeral first appears.

DETAILED DESCRIPTION

As used herein, the directional terms "first" vs. "last" and "upstream" vs. "downstream" are used with respect to the direction of data flow. Also as used herein, the term "message" generally refers to an electronic signal representing a digital message. These terms are used to simplify the description that follows.

The configuration of conventional stackable network switches requires a great deal of effort from the user to configure to support quality of service. Embodiments of the present invention provide automatic configuration of a stackable network switch to support quality of service, as described in detail below.

FIG. 1 shows a stackable network switch 100 connected to a network 110 such as the Internet according to a preferred embodiment. Of course, stackable network switch 100 can be connected to other networks to function as a router. Network 110 can comprise two or more connected networks. Stackable network switch 100 comprises a plurality of stack units 104. Like regular network switches, each stack unit 104 comprises ports 102, a forwarding engine 114, and a control plane processor (CPP) 112. But each stack unit 104 also includes one or more stacking interfaces 106 for interconnecting a plurality of the stack units 104 via stacking links 108 to form stackable network switch 100, in which one of the stack units 104 is generally configured as the master stack unit. Stackable network switch 100 then performs as a single large switch, with the control plane processor of the master stack unit acting as the control plane processor for the entire stackable switch, as is well-known in the relevant arts.

While embodiments of the present invention are described with respect to a stackable network switch 100 comprising only three stack units 104, these embodiments are easily extended to include larger numbers of stack units 104 interconnected in this and other network topologies, as will be apparent to one skilled in the relevant arts after reading this description. In fact, embodiments of the present invention are especially useful in complex switch configurations.

Figure 2:
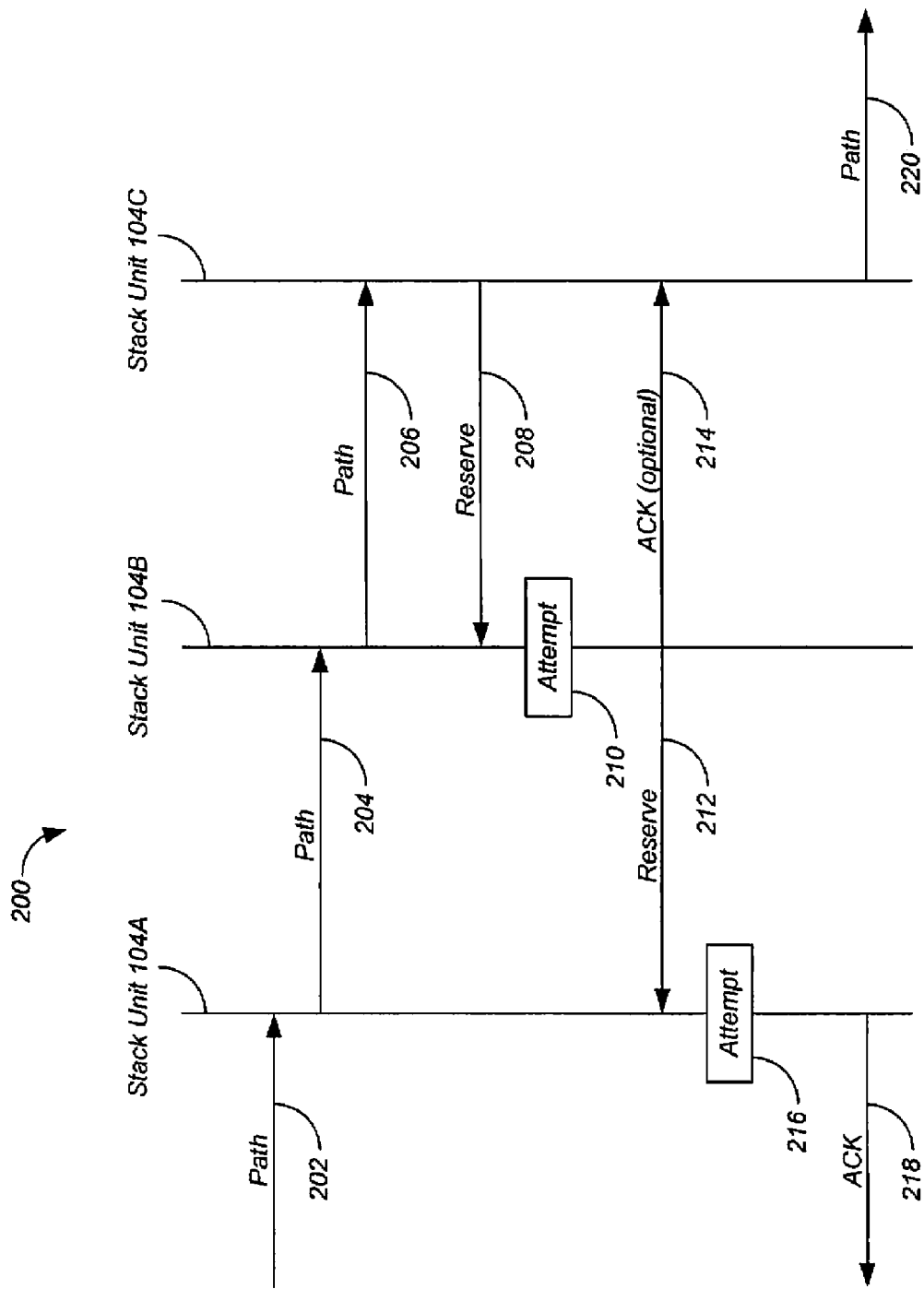
FIG. 2 shows a process for configuring the network switch of FIG. 1 to support quality of service.

FIG. 2 shows a process 200 for configuring switch 100 of FIG. 1 to support quality of service. Process 200 begins when switch 100 receives a request to reserve resources in the switch for a planned data flow through the switch (202). The request identifies the planned data flow and the quality of service requested for the planned data flow. The planned data flow can be identified by specifying the values of one or more fields in packets in the data flow, such as source address, destination address, protocol type, Differentiated Services (DiffServe) Code Point (DSCP) field, Transmission Control Protocol/User Datagram Protocol (TCP/UDP) ports and the like, by identifying the ingress and egress ports of the flow and the like, or any combination thereof. The quality of service for the planned data flow can be identified by specifying requirements for the planned data flow, such as bandwidth, latency, and the like, by specifying one of a plurality of predefined classes of service, and so on.

The request can be a user configuration request sent by a user configuring the switch, an automated network reservation request such as a Resource Reservation Protocol (RSVP) Path message, and the like. The RSVP protocol is describe in Request for Comments (RFC) 2205, which can be found on the world-wide web at the following uniform resource locator (URL): http://www.faqs.org/rfcs/rfc2205.html.

In response to the request to reserve resources, the control plane processor (CPP) 112 in the stack unit that received the request identifies a path for the planned data flow within switch 100. The identified path comprises a plurality of the stack units 104 interconnected in series by one or more of the stacking links 108.

Referring to FIG. 1, assume the request to reserve resources is received by stack unit 104A. Based on the request and internal routing tables, CPP 112A determines the planned data flow should ingress switch 100 through port 102A of stack unit 104A and egress switch 100 through port 102C of stack unit 104C, and identifies a path for the planned data flow from port 102A through stacking link 108A to stack unit 104B, and then through stacking link 108B to port 102C of stack unit 104C.

CPP 112A then transmits a "path" message along the identified path to the CPP 112 of the last stack unit in the path (204), which is CPP 112C in the embodiment of FIG. 1. The CPPs 112 in each of the intermediate stack units (that is the stack units other than the first and last stack units) in the path receive the path message from the next upstream stack unit in the path, and transmit the path message to the next downstream stack unit in the path (206). In response to the path message, the CPP 112 in the last stack unit in the path transmits a "reserve" message over the identified path (208).

The CPPs 112 in each of the intermediate stack units receive the reserve message from the next downstream stack unit in the path, and make an attempt to reserve resources on the stack link connected to the next downstream stack unit according to the class of service of the planned data flow (210). For example, referring to FIG. 1, CPP 112B, on receiving a reserve message from CPP 112C, makes an attempt to reserve resources on stacking link 108B by changing the weights of queues in stacking interface 106C. However, embodiments of the invention are independent of the method used to reserve resources on the stacking links.

If the attempt to reserve resources is successful, the CPP of the intermediate stack unit transmits the reserve message, which may be modified to reflect the reservation, to the next upstream stack unit in the path (212). Optionally, the CPP of the intermediate stack unit may transmit a success message (ACK) to the CPP of the next downstream stack unit (214).

The CPP 112 in the first stack unit receives the reserve message from the next downstream stack unit in the path, and makes an attempt to reserve resources on the stack link connected to the next downstream stack unit according to the class of service of the planned data flow (216). For example, referring to FIG. 1, CPP 112A, on receiving a reserve message from CPP 112B, makes an attempt to reserve resources on stacking link 108A.

If all of the attempts to reserve resources are successful, the CPP of the first stack unit transmits a confirmation message (ACK) to the sender of the request to reserve resources (218). For example, if the request to reserve resources was an RSVP Path message sent by an upstream network device in network 110, the CPP of the first stack unit sends the ACK message to the upstream network device. In addition, in the case of an RSVP request, the last stack unit in the path sends an RSVP Path message (220) to the downstream network device identified by the RSVP Path message received at 202. Thus embodiments of the present invention are compatible with the RSVP protocol.

However, if an attempt by an intermediate stack unit to reserve resources is unsuccessful, the CPP of the intermediate stack unit optionally may transmit a failure message to the CPP of the next downstream stack unit, which can be propagated back to the first stack unit in the path. In the event of such a failure to reserve resources for the planned data flow, the CPP of the first stack unit identifies a second path for the planned data flow within the stackable network switch and executes process 200 again, this time over the second path. If no path can be reserved for the planned data flow, the CPP of the first stack unit in the path optionally informs the sender of the request to reserve resources on the switch of the failure.

Some embodiments automatically cope with changes in the topology of the interconnected stack units by executing process 200. For example, when a stack unit or stack link in the path of the data flow fails, the failure triggers process 200 to execute, thereby creating a new path for the data flow. In addition, the resource reservations on the old path are released.

Any technique can be used to detect topology changes. For example, the control plane processor in the first stack unit in the path periodically transmits a refresh message over the path, which is propagated to the end of the path. When a stack unit in the path does not receive one of the refresh messages during a predetermined interval, the control plane processor in the stack unit releases the bandwidth reserved on the stack link connected to the next upstream stack unit.

Figure 3:
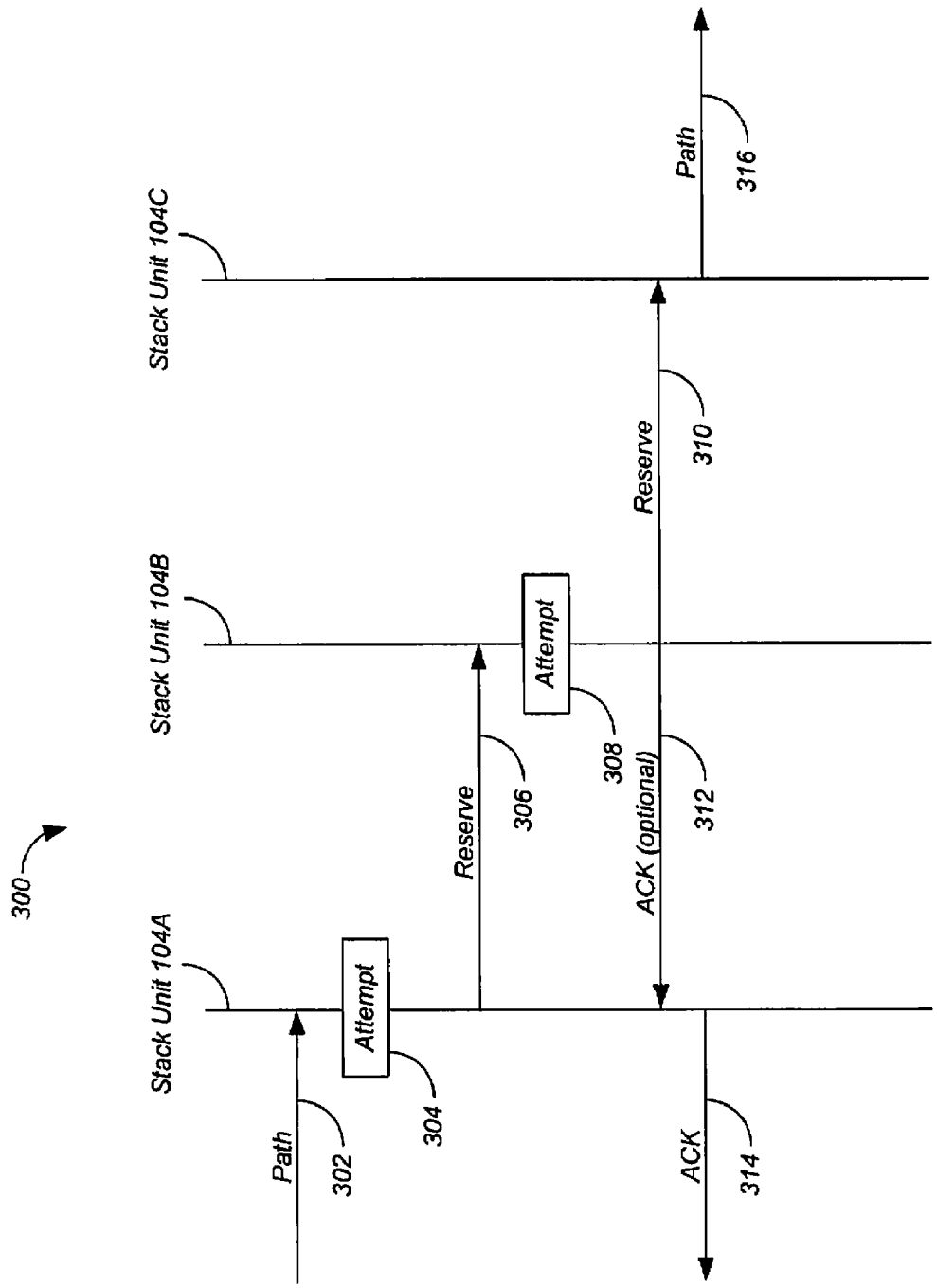
FIG. 3 shows another process for configuring the network switch of FIG. 1 to support quality of service.

FIG. 3 shows another process 300 for configuring switch 100 of FIG. 1 to support quality of service. Process 300 begins when switch 100 receives a request to reserve resources in the switch for a planned data flow through the switch (302). The request identifies the planned data flow and the quality of service requested for the planned data flow. The planned data flow, and the quality of service for the planned data flow, can be identified as described above.

The request can be a user configuration request, an automated network reservation request such as a Resource Reservation Protocol (RSVP) Path message, and the like, as described above.

In response to the request to reserve resources, the control plane processor (CPP) 112 in the stack unit that received the request identifies a path for the planned data flow within switch 100. The identified path comprises a plurality of the stack units 104 interconnected in series by one or more of the stacking links 108.

Referring again to FIG. 1, assume the request to reserve resources is received by stack unit 104A. Based on the request and internal routing tables, CPP 112A determines the planned data flow should ingress switch 100 through port 102A of stack unit 104A and egress switch 100 through port 102C of stack unit 104C, and identifies a path for the planned data flow from port 102A through stacking link 108A to stack unit 104B, and then through stacking link 108B to port 102C of stack unit 104C.

CPP 112A then makes an attempt to reserve resources on the stack link connected to the next downstream one of the stack units according to the class of service of the planned data flow (304). If the attempt is successful, CPP 112A then transmits a "reserve" message along the identified path (306). The CPPB 112 in each of the intermediate stack units receive the reserve message from the next upstream stack unit in the path, and make an attempt to reserve resources on the stack link connected to the next downstream one of the stack units according to the class of service of the planned data flow. For example, referring to FIG. 1, CPP 112B, on receiving a reserve message from CPP 112A, makes an attempt to reserve resources on stacking link 108B (308). As with process 200, embodiments of the invention are independent of the method used to reserve resources on the stacking links.

If the attempt to reserve resources is successful, the CPP of the intermediate stack unit transmits the reserve message, which may be modified to reflect the reservation, to the next downstream stack units in the path (310). Optionally, the CPP of the intermediate stack unit may transmit a success message (ACK) to the CPP of the next upstream stack unit (312). The CPP 112 in the last stack unit receives the reserve message from the next upstream stack unit in the path.

If all of the attempts to reserve resources are successful, the CPP of the first stack unit transmits a confirmation message (ACK) to the sender of the request to reserve resources (314). For example, if the request to reserve resources was an RSVP Path message sent by an upstream network device in network 110, the CPP of the first stack unit sends the ACK message to the upstream network device. In addition, in the case of an RSVP request, the last stack unit in the path sends an RSVP Path message (316) to the downstream network device identified by the RSVP Path message received at 302. Thus embodiments of the present invention are compatible with the RSVP protocol.

However, if an attempt by an intermediate stack unit to reserve resources is unsuccessful, the CPP of the intermediate stack unit optionally may transmit a failure message to the CPP of the first stack unit in the path. In the event of such a failure to reserve resources for the planned data flow, the CPP of the first stack unit identifies a second path for the planned data flow within the stackable network switch and executes process 300 again, this time over the second path. If no path can be reserved for the planned data flow, the CPP of the first stack unit in the path optionally informs the sender of the request to reserve resources on the switch.

Some embodiments automatically cope with changes in the topology of the interconnected stack units by executing process 300. For example, when a stack unit or stack link in the path of the data flow fails, the failure triggers process 300 to execute, thereby creating a new path for the data flow. In addition, the resource reservations on the old path are released.

Any technique can be used to detect topology changes. For example, the control plane processor in the first stack unit in the path periodically transmits a refresh message over the path, which is propagated to the end of the path. When a stack unit in the path does not receive one of the refresh messages during a predetermined interval, the control plane processor in the stack unit releases the bandwidth reserved on the stack link connected to the next upstream stack unit.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network switch, comprising:
a first sub-switch comprising:
a plurality of ports;
a forwarding engine that communicates with the ports;
a control plane processor that communicates with the forwarding engine;
a first sub-switch interface that communicates with the forwarding engine and that receives a path message from a second sub-switch in the network switch;
a second sub-switch interface that communicates with the forwarding engine; and
a third sub-switch,
wherein the second sub-switch interface transmits the path message to the third sub-switch in the network switch,
wherein the second sub-switch interface receives a reserve message from the third sub-switch that identifies requested resources for a planned data flow having a quality of service,
wherein the control plane processor attempts to reserve the requested resources on the second sub-switch interface based on the quality of service, and
wherein the first sub-switch, the second sub-switch and the third sub-switch directly send data to and directly receive data from a common external network, and
wherein the third sub-switch generates the reserve message to reserve the requested resources of the first sub-switch and the second sub-switch in response to the path message.

2. The network switch of claim 1, wherein when the attempt to reserve the resources is successful, the control plane processor transmits the reserve message to the second sub-switch.

3. The network switch of claim 1, wherein the planned data flow comprises packets received by a port of one of the second sub-switch and another sub-switch upstream from the second sub-switch.

4. The network switch of claim 3, wherein the packets include a predetermined value in at least one field.

5. The network switch of claim 4, wherein the predetermined value represents at least one of a group consisting of:
source address;
Differentiated Services (DiffServe) Code Point (DSCP) field;
one or more of the ports;
destination address; and
protocol type.

6. The network switch of claim 1, wherein when the attempt to reserve the resources is successful, the control plane processor transmits a confirmation message to the second sub-switch.

7. The network switch of claim 1, wherein when the attempt to reserve the resources is unsuccessful, the control plane processor transmits a failure message to the second sub-switch.

8. The network switch of claim 1, further comprising the second sub-switch.

9. The network switch of claim 8, wherein ports of the first, second and third sub-switches are connected in parallel to the common external network.

10. The network switch of claim 1, wherein the first, second and third sub-switches are connected in series.

11. A network switch comprising:
a plurality of sub-switches that are connected in series and that each directly communicate with a common external network, wherein each of the sub-switches comprises:
a plurality of ports;
a forwarding engine that communicates with the ports; and
a control plane processor that communicates with the forwarding engine,
wherein the control plane processor in a first one of the sub-switches determines a path in the network switch for a planned data flow having a quality of service and transmits a reserve message over the path,
wherein the control plane processors in others of the sub-switches in the path receive the reserve message from a next upstream one of the sub-switches in the path and attempts to reserve resources of a sub-switch interface connected to the next upstream one of the sub-switches based on the quality of service of the planned data flow, wherein the one of the sub-switches that is upstream from the first one of the sub-switches generates the reserve message to reserve the resources of the first one of the sub-switches and the others of the sub-switches in response to a path message, and wherein the reserve message originates from the one of the sub-switches that is upstream from the first one of the sub-switches.

12. The network switch of claim 11, wherein the control plane processor in at least one of the sub-switches in the path transmits a reserve message to a next downstream one of the sub-switches in the path when the attempt to reserve the resources is successful.

13. The network switch of claim 11, wherein a second one of the sub-switches receives the planned data flow from the common external network and a third one of the sub-switches transmits the planned data flow to the common external network.

14. The network switch of claim 11, wherein the planned data flow comprises packets received by a predetermined port of the first one of the sub-switches and having predetermined values in at least one field of the packets.

15. The network switch of claim 14, wherein the predetermined values represent at least one of a group consisting of:
   source address;
   Differentiated Services (DiffServe) Code Point (DSCP) field;
   one or more of the ports;
   destination address; and
   protocol type.

16. The network switch of claim 11, wherein the control plane processor of the first one of the sub-switches receives a request to reserve resources in the network switch for the planned data flow and identifies the path for the planned data flow based on the request to reserve resources.

17. The network switch of claim 16, wherein the control plane processor of the first one of the sub-switches transmits a confirmation message to a sender of the request to reserve resources when all attempts to reserve the resources are successful.

18. The network switch of claim 16, wherein the request to reserve resources is selected from a group consisting of:
   a Resource Reservation Protocol (RSVP) Path message; and
   a user configuration request.

19. The network switch of claim 16, wherein when at least one attempt to reserve the resources is unsuccessful, the control plane processor in the first one of the sub-switches identifies a second path for the planned data flow within the network switch.

20. A first sub-switch for a network switch, comprising:
   a forwarding engine;
   a port that communicates with the forwarding engine and receives a path message from a network device upstream from the network switch, wherein the path message identifies requested resources for a planned data flow;
   a first sub-switch interface that communicates with the forwarding engine and a second sub-switch of the network switch; and
   a control plane processor that communicates with the forwarding engine and attempts to reserve the requested resources of the second sub-switch and a third sub-switch in response to the path message,
   wherein the network switch comprises the third sub-switch and the third sub-switch is downstream from the second sub-switch,
   wherein the control plane processor originates and transmits a reserve message to the second sub-switch based on whether the attempt to reserve the resources is successful, and
   wherein the first sub-switch, the second sub-switch and the third sub-switch directly send data to and directly receive data from a common external network.

* * * * *